US012131104B2

(12) United States Patent
Hou et al.

(10) Patent No.: US 12,131,104 B2
(45) Date of Patent: Oct. 29, 2024

(54) COUPLING NUMERICAL SIMULATION METHOD FOR SITE SELECTION OF UNDERGROUND SALT CAVERN HYDROGEN STORAGE

(71) Applicants: Sichuan University, Sichuan (CN); Zhengzhou University, Henan (CN)

(72) Inventors: Zhengmeng Hou, Henan (CN); Yanli Fang, Sichuan (CN); Jianhua Liu, Henan (CN); Liangchao Huang, Henan (CN); Jianwei Tang, Henan (CN); Li Ren, Sichuan (CN)

(73) Assignees: Sichuan University, Sichuan (CN); Zhengzhou University, Henan (CN)

( * ) Notice: Subject to any disclaimer, the term of this patent is extended or adjusted under 35 U.S.C. 154(b) by 0 days.

(21) Appl. No.: 18/442,107

(22) Filed: Feb. 15, 2024

(65) Prior Publication Data
US 2024/0289521 A1 Aug. 29, 2024

(30) Foreign Application Priority Data
Feb. 24, 2023 (CN) .......................... 202310162386.5

(51) Int. Cl.
*G06F 30/23* (2020.01)
*E21B 41/00* (2006.01)
*G06F 111/10* (2020.01)

(52) U.S. Cl.
CPC .......... *G06F 30/23* (2020.01); *E21B 41/0057* (2013.01); *E21B 2200/20* (2020.05); *G06F 2111/10* (2020.01)

(58) Field of Classification Search
CPC .. G06F 30/23; G06F 2111/10; E21B 41/0057; E21B 2200/20
See application file for complete search history.

(56) References Cited

PUBLICATIONS

J. Rutqvist, et al., "A modeling approach for analysis of coupled multiphase fluid flow, heat transfer, and deformation in fractured porous rock," International Journal of Rock Mechanics & Mining Sciences 39 (2002) 429-442 (Year: 2002).*
P. H. Winterfeld, et al., "An Overview of our Coupled Thermal-Hydrological-Mechanical Simulator for Porous and Fractured Media," ARMA 20-1252, p. 1-12 (2020) (Year: 2020).*
Winjing Li, et al., "Investigation of thermal-mechanical effects on salt cavern during cycling loading," Energy 232 p. 1-13 (2021) ( Year: 2021).*

* cited by examiner

*Primary Examiner* — Steven W Crabb

(57) ABSTRACT

The disclosure relates to the field of underground salt cavern energy storage, and discloses a coupling numerical simulation method for site selection of an underground salt cavern hydrogen storage, which specifically comprises the following. Geological data of an area where the salt cavern hydrogen storage is to be established is obtained. A three-dimensional model is established and grid meshing is performed. An initial coupling field is established and balanced based on the geological model, and then excavation simulation of the salt cavern hydrogen storage is performed. A geological model after excavation and related parameter values thereof are imported into TOUGH2MP software, a stress model in FLAC3D software is coupled with hydraulic and thermal models in the TOUGH2MP software to simulate a stress, hydraulic, and thermal coupling behavior process of rock layers around the salt cavern hydrogen storage in the area, and a coupled simulation result is obtained.

8 Claims, 8 Drawing Sheets

(a) Rock salt permeability $10^{-19}$ m$^2$ (b) Rock salt permeability $10^{-20}$ m$^2$ (c) Rock salt permeability $10^{-21}$ m$^2$ (d) Rock salt permeability $10^{-22}$ m$^2$

COUPLING NUMERICAL SIMULATION METHOD FOR SITE SELECTION OF UNDERGROUND SALT CAVERN HYDROGEN STORAGE

CROSS-REFERENCE TO RELATED APPLICATION

This application claims the priority benefit of China application serial no. 202310162386.5, filed on Feb. 24, 2023. The entirety of the above-mentioned patent application is hereby incorporated by reference herein and made a part of this specification.

BACKGROUND

Technical Field

The disclosure relates to the technical field of underground salt cavern energy storage, and particularly relates to a coupling numerical simulation method for site selection of an underground salt cavern hydrogen storage.

Description of Related Art

Under the guidance of the "double carbon" goal, China will comprehensively transform into a low-carbon economy and usher in a new round of energy revolution. Hydrogen energy has hydrogen-electricity interchangeability and may be widely used in deep decarbonization in fields such as transportation, industry, electric power, and construction. It is the secondary clean energy with the greatest development potential. Underground hydrogen storage in salt caverns is an ideal place for pure hydrogen storage. Currently, there are four underground salt cavern pure hydrogen storages in operation around the world. In addition, countries such as the United Kingdom, Germany, and the United States are planning to build underground salt cavern hydrogen storage to meet the national hydrogen energy strategic needs of the country. With the development of hydrogen energy in China, it is imperative to build underground salt cavern hydrogen storage. China already has a complete set of site selection standards for underground salt cavern natural gas storage, but there is no site selection standard for underground salt cavern hydrogen storage. Considering that hydrogen is the lightest gas in the world and has low viscosity and easy diffusion compared to natural gas, the site selection of underground salt cavern hydrogen storage should be more stringent than the site selection of underground salt cavern natural gas storage, especially in terms of sealing. Previous simulations on the site selection of underground salt cavern natural gas storage have mostly focused on evaluating the rock salt creep stability. Also, due to the unique physical properties of hydrogen, the simulation of underground salt cavern hydrogen storage has to take into account the sealing property of the rock salt to hydrogen. To this end, a coupling numerical simulation method for site selection of underground salt cavern hydrogen storage based on thermal-hydraulic-stress (THM) calculation is proposed, which aims to comprehensively evaluate the sealing of the storage and rock salt creep stability in the site selection area and provides a theoretical basis for the site selection of underground salt cavern hydrogen storage.

SUMMARY

In view of the problems and deficiencies existing in the existing technology, the purpose of the disclosure is to provide a coupling numerical simulation method for site selection of an underground salt cavern hydrogen storage, which provides scientific and effective theoretical support for the site selection of underground salt cavern hydrogen storage for China, thereby the reasonable site selection of salt cavern hydrogen storage to be established underground is ensured.

Based on the above purpose, the disclosure adopts the following technical solutions:

A first aspect of the disclosure provides a coupling numerical simulation method for site selection of an underground salt cavern hydrogen storage, comprising the following steps.

S1. Geological data of an area where the salt cavern hydrogen storage is to be established is obtained.

S2. A three-dimensional model is established and grid meshing is performed. Based on the geological data, a geological model of the area where the single salt cavern hydrogen storage is to be established is established by suing FLAC3D software, and the geological model is divided into computational grids. Then, computational grid densification processing is performed on a peripheral area of a target area of the salt cavern hydrogen storage in the geological model, and a set of computational grids on an inner edge of the target area of the salt cavern hydrogen storage is selected as separate grids.

S3. An initial coupling field is established and balanced based on the geological model, and then excavation simulation of the target area of the salt cavern hydrogen storage in the geological model is performed to obtain a geological model after excavation.

S4. The geological model after excavation is imported into TOUGH2MP software, and parameter values of the separate grids in the geological model after excavation are reset in the TOUGH2MP software.

S5. A stress model in the FLAC3D software is coupled with hydraulic and thermal models in the TOUGH2MP software, a stress, hydraulic, and thermal coupling behavior process of a rock layer around the target area of the salt cavern hydrogen storage in the geological model after excavation is simulated to obtain a coupled simulation result.

In the disclosure, some internal grids (that is, the separate grids) in the salt cavern after the model is established are specially processed, for example, the porosity is set to 0.999, the permeability is set to $10^{-9}$ $m^2$, and the hydrogen gas saturation is set to 1.0. In this way, the special grid is regarded as the hydrogen stored inside the salt cave, then, on this basis, the coupling simulation process of the TOUGH2MP software, which is good at hydraulic and thermal calculations of the rock, and the FLAC3D software, which is widely used in rock salt creep large deformation calculations, is launched, and hydraulic-thermal-stress (THM) coupling numerical simulation research on site selection of the salt cavern storing hydrogen is carried out by using the method, which makes up for the shortcomings of the FLAC3D software that can merely simulate salt cavern stress calculations. According to the simulation result of the disclosure, site selection suggestions for the salt cavern hydrogen storage to be established may be given from perspectives of, for example, sealing properties of the rock salt and the caprock layer, the thickness of the salt layer, variability of interlayers, and rock salt creep stability.

BRIEF DESCRIPTION OF THE DRAWINGS

in FIG. 1, the stored hydrogen grid represents the black area to the left of the text.

DESCRIPTION OF THE EMBODIMENTS

Figure 1:
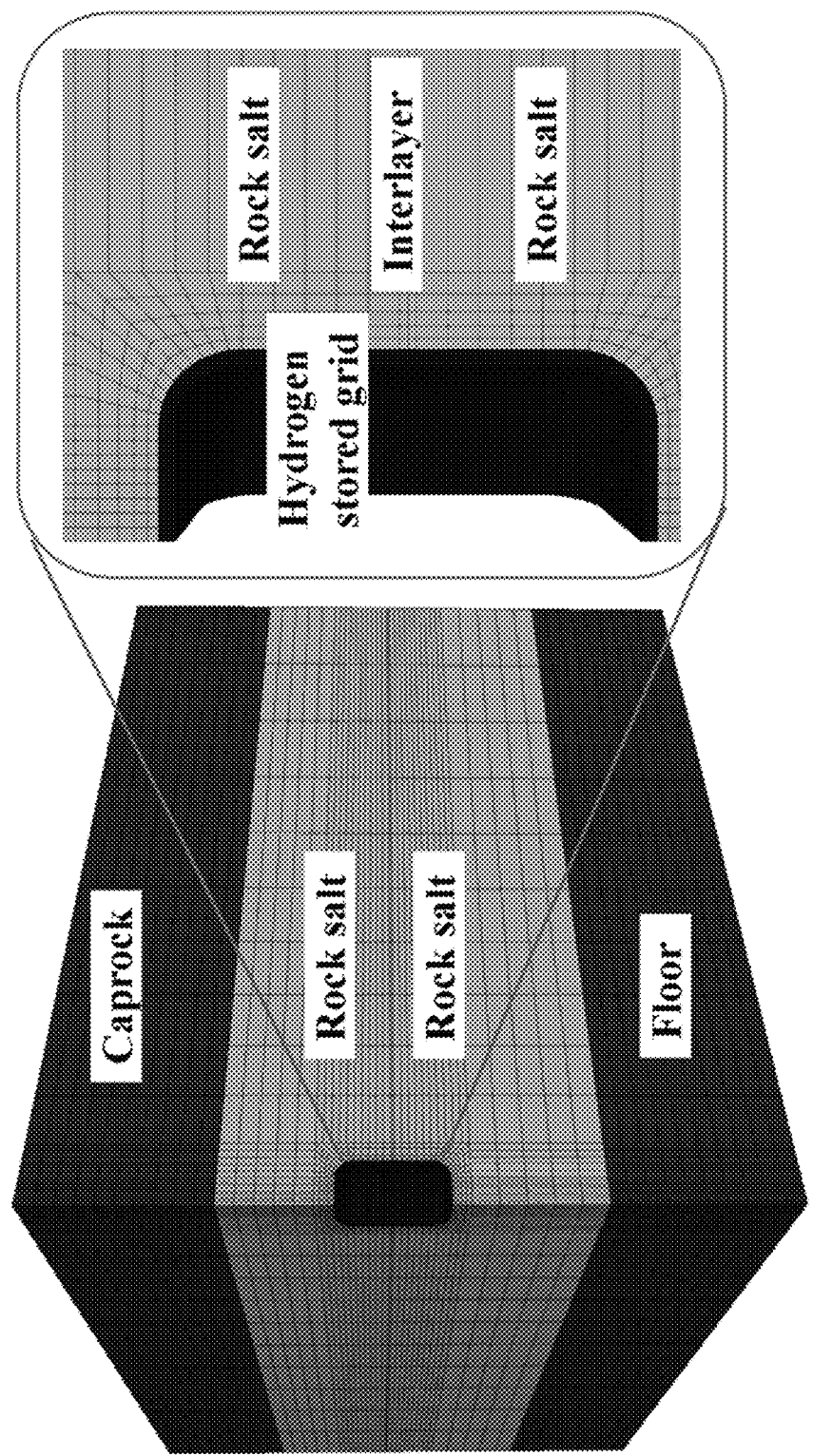
FIG. 1 is a schematic diagram of a one-to-quarter three-dimensional geological model after excavation established according to Embodiment 1 of the disclosure.

The embodiments and features in the embodiments according to the disclosure may be combined with each other in situations where no conflict occurs. The disclosure will be described in detail below in the embodiments with reference to the accompanying drawings.

Embodiment 1

The embodiment provides a coupling numerical simulation method for site selection of an underground salt cavern hydrogen storage, which comprises the following steps.

S1. Geological data of an area (unexploited salt mine) where the salt cavern hydrogen storage is to be established is obtained. The geological data includes, for example, as follows. The average burial depth of the roof of the caprock layer is 800 to 1200 m, the average burial depth of the roof of the salt layer is 1000 to 1400 m, and the total thickness of the salt layer is at least 200 m. The interlayer of the salt layer is mostly mudstone with an average thickness of 2.8 m and a thickness generally being within 5 m. The average density of the rock salt is 2220 kg/m$^3$. The average density of the caprock layer, the floor, and the interlayer is 2490 kg/m$^3$. The ground temperature of the area is 10° C. The temperature gradient is 0.03° C./m.

S2. A three-dimensional model is established and grid meshing is performed. A geological model of the area where the single salt cavern hydrogen storage is to be established is established by using FLAC3D software according to the geological data, and the geological model is divided into computational grids. Afterward, computational grid densification processing is performed on a peripheral area of the target area of the salt cavern hydrogen storage in the geological model, and a set of computational grids on an inner edge of the target area of the salt cavern hydrogen storage is selected as separate grids.

Subsequent hydraulic-thermal-stress (THM) coupling numerical simulation research is carried out according to the geological model. Rock layers of the geological model are the caprock layer, the salt layer, the interlayer, the salt layer, and the floor from top to bottom. The upper boundary of the model is −900 m, that is, the burial depth is 900 m. The thickness of the caprock layer and the floor are each 100 m, the total thickness of the salt layer is 200 m, and the thickness of the interlayer is 4 m. Passing through the center of the simulated salt cavern hydrogen storage, the thickness from the roof to the caprock layer of the salt cavern is 60 m. The inner peripheral of the salt cavern is provided with the special grids (that is, the separate grids) representing the stored hydrogen.

S3. An initial coupling field (comprising an initial in-situ stress field, a temperature field, and a seepage field) is established and balanced based on the geological model according to the geological data, and then numerical simulation of an excavation process is performed in the target area of the salt cavern hydrogen storage in the geological model to obtain an geological model after excavation. The numerical simulation of the excavation process excavates the salt cavern by using a null model, at the same time, the internal pressure of the excavation is set, and the excavation area is set as the internal area of the separate grids in the target area of the salt cavern hydrogen storage, that is, the separate grids are retained by the geological model after excavation. Further, the internal pressure of the excavation is a maximum operable pressure of the salt cavern, and the maximum operable pressure of the salt cavern is 80% to 90% of the original rock stress of the roof of the salt cavern applied around the salt cavern.

The specific steps to establish and balance the initial coupling field based on the geological model are as follows.

S31: A constraint boundary of the geological model is set, and an overlying rock layer pressure is applied. Afterward, the initial in-situ stress field, temperature field, and seepage field of the geological model are established.

1) Horizontal displacement constraint boundaries are set on the front, back, left, and right surfaces of the geological model. At the same time, a vertical displacement constraint boundary is set on the lower surface, while a free boundary is set on the upper surface, and the overlying rock layer pressure is evenly applied on the upper surface (the upper boundary of the general geological model is −900 meters, and the overlying rock layer pressure of the area of 900 meters or more is applied on the upper surface), and the calculation formula is:

$$P_0 = -\sum \rho_i g h_i$$

In the formula, i is the type of rock in the overlying layer (such as mudstone or sandstone); $\rho_i$ is the density of type i rock (unit: kg/m$^3$); g is the acceleration of gravity (unit: m/s$^2$); $h_i$ is the thickness of type i rock (unit: m); and a negative sign means that in the established model, it is assumed that the ground is Z=0, the entire model is in an area with a negative Z value, and in FLAC3D, it is stipulated that the rock compressive stress is negative.

From the geological data collected in step S1, it may be known that the average density of the rock salt in the area is 2220 kg/m³, and the average density of the caprock layer, the floor, and the interlayer is 2490 kg/m³. The overlying rock layer pressure of the upper surface of the model is calculated to be approximately 21.96 MPa.

2) Based on the geological data (for example, the ground temperature of the area is 10° C., the temperature gradient is 0.03° C./m, and the pore pressure is merely set to be slightly greater than the atmospheric pressure), the initial in-situ stress field, temperature field, and seepage field of the geological model are established. The calculation formula of the initial in-situ stress field is:

$$P = P_0 + \rho_i g(Z_{ibottom} - Z_{iroof})$$

In the formula, $P_0$ is the overlying rock layer pressure applied to the upper surface of the model (unit: Pa); $\rho_i$ is the density of type i rock in the model (unit: kg/m³); $Z_{ibottom}$ is the Z coordinate value of the bottom boundary of type i rock in the model (unit: m); and $Z_{iroof}$ is the Z coordinate value of the roof boundary of type i rock in the model (unit: m).

The temperature field adopts a temperature field with a constant temperature gradient, and the calculation formula is:

$$T = T_0 - \Delta T Z$$

In the formula, $T_0$ is the ground temperature (unit: ° C.); $\Delta T$ is the temperature gradient in the vertical direction (unit: ° C./m); and Z is the Z coordinate value of the model (a negative value; unit: m).

Considering that the rock salt and the caprock layer thereof are almost impermeable layers, when setting the seepage field, the pore pressure may be set to be just greater than the atmospheric pressure.

S32: A balance calculation (a balance condition being that a maximum balance ratio is less than 1e⁻⁵) of the initial in-situ stress field, temperature field, and seepage field is performed, and then the balanced values of parameters comprising gravity, temperature, and pore pressure are input into each computational grid, comprising the separate grid, of the geological model.

S4. The geological model after excavation is imported into the TOUGH2MP software, which also means that, the computational grids (comprising the separate grids) of the geological model and the parameter values comprising the gravity, temperature, and pore pressure stored in each computational grid are imported into the TOUGH2MP software to be used for subsequent hydraulic and thermal calculations. Afterward, the parameter values of the separate grids in the geological model after excavation are reset in the TOUGH2MP software.

The specific steps to reset the parameter values of the separate grids in the TOUGH2MP software are as follows. A volume of the separate grid is increased to the actual volume of the salt cavern hydrogen storage (the general geological model is a one-quarter model, that is, one-fourth of the actual volume of the salt cavern) to obtain the hydrogen grid. Afterward, the porosity of the hydrogen grid is set to 0.999, the permeability is set to 1×10⁻⁹ m² (as long as being significantly greater than the permeability of the surrounding rock salt), the hydrogen gas saturation is set to 1.0, and other parameters are set the same as the computational grid around the hydrogen grid (the pore pressure of the hydrogen grid is modified to the internal pressure of the salt cavern required to be simulated, which is 20 MPa). It should be noted that the hydrogen gas saturation of the computational grid around the hydrogen grid is set to 0.0. The one-quarter three-dimensional geological model after excavation is shown in FIG. 1, and the black square in the middle represents the hydrogen grid.

The pore pressure of the hydrogen grid is the simulated internal pressure value of the salt cavern, and the simulated internal pressure value of the salt cavern is set to the maximum operable pressure of the salt cavern (generally, the maximum operable pressure of the salt cavern is 80% to 90% of the original rock stress of the roof of the salt cavern). Since the simulation is mainly used for site selection research rather than salt cavern operation period research, adopting the maximum pressure to perform simulation is beneficial to well screening appropriate storage establishment parameters.

It should be noted that hydrogen and water are described by using the EOS5 module in TOUGH2MP. Further, there is no need to reset the parameters of the separate grid in the FLAC3D software, because the separate grid represents the target area of the salt cavern hydrogen storage, which is hollow and mainly comprises hydrogen, and the stress calculation is mainly for the rock salt, that is, the separate grid is not involved in the stress calculation in FLAC3D, while the computational grid representing the rock salt on the periphery of the separate grid is involved in the stress calculation.

S5. The stress model in the FLAC3D software is coupled with the hydraulic and thermal models in the TOUGH2MP software, and the stress, hydraulic, and thermal coupling behavior process of the rock layers around the target area of the salt cavern hydrogen storage in the geological model after excavation is simulated to obtain a coupled simulation result. The coupling simulation process is performed by an internal code.

S51. Settings are initialized and the initial values of hydraulic and thermal parameters and the simulation time in FLAC3D and TOUGH2MP are synchronously updated. Then, the hydraulic and thermal parameters are simulated and calculated in TOUGH2MP, while the stress is simulated and calculated in the FLAC3D software.

The specific steps to initialize settings and synchronously update the initial values of hydraulic and thermal parameters and the simulation time in FLAC3D and TOUGH2MP are as follows. First, the initial values of some hydraulic and thermal parameters (among the hydraulic parameters, for example, the rock salt porosity is set to 0.2% and 0.5%, the rock salt permeability is set to 10⁻¹⁹ to 10⁻²² m², the interlayer permeability is set to 10⁻¹⁷ to 10⁻²² m²; and among the thermal parameters, the thermal conductivity coefficient of rock salt is set to 7.0 W/(m·° C.), the specific heat capacity of rock salt is set to 860 J/(kg·° C.)) of each rock layer and the simulation time (set to 30 years) in FLAC3D are set according to relevant parameter information in the FLAC3D software. Then, the initial values relevant to the hydraulic and thermal parameters of each rock layer and the simulation time in FLAC3D are synchronously updated to the TOUGH2MP software (while the initial value of the rock pore saturation among the hydraulic parameters are directly imported into TOUGH2MP from FLAC3D). It should be noted that the sensitivity of the impact of the parameter to the site selection of the hydrogen storage may be examined by setting and calculating different porosity and permeability of the rock salt and the caprock layer.

It should be noted that in the simulation calculation of the hydraulic parameter by the TOUGH2MP software, the basic mass and energy calculation is expressed as follows: the mass flux change of any grid in TOUGH2MP is the sum of the flux of the connected grid thereof and the injection source, and the calculation formula is:

$$\frac{d}{dt}\int_{V_n} M^k dV_n = \int_{\Gamma_n} \vec{F}^k \cdot \vec{n} d\Gamma_n + \int_{V_n} q^k dV_n \tag{a}$$

In the formula, $M^k$ is the molar mass per unit volume (unit: mol/m³); k is the mass component; $V_n$ is the control quantity of any subdomain in the flow system (unit: m³); $\vec{F}^k$ is the mass flux of component k (unit: mol/(m²·s)); $\Gamma_n$ is the closed area of the control quantity $V_n$ (unit: m²); $\vec{n}$ is the normal vector of $d\Gamma_n$; and $q^k$ is the sink and source of component k (unit: mol/(m³·s)).

In the above formula (a), the mass formula of $M^k$ is:

$$M^k = \phi \sum_\beta S_\beta \rho_\beta X_\beta^k \tag{b}$$

In the formula, $M^k$ is the molar mass per unit volume (unit: mol/m³); $\phi$ is the porosity of rock, dimensionless; $S_\beta$ is the saturation of β phase, dimensionless; $\rho_\beta$ is the mass density of β phase (unit: kg/m³); and $X_\beta^k$ is the mass fraction of component k in β phase.

In the above formula (a), the mass flux $\vec{F}^k$ of component k (in the EOS5 model, there are two components of hydrogen and water) is calculated as:

$$\vec{F}^k = \sum_\beta X_\beta^k \vec{F}_\beta \tag{c}$$

In the formula, $\vec{F}_\beta$ is the mass flux of β phase (unit: mol/(m²·s)); and $X_\beta^k$ is the mass fraction of component k in β phase, dimensionless.

In the above formula (c), since the calculation of multiphase fluid flow in each rock pore in TOUGH2MP follows Darcy's law, the calculation formula for the mass flux of β phase is:

$$\vec{F}_\beta = -k \frac{k_{r\beta} \rho_\beta}{\mu_\beta} \left( \vec{\nabla} P_\beta - \rho_\beta \vec{g} \right) \tag{d}$$

In the formula, k is the absolute permeability of rock (unit: m²); $k_{r\beta}$ is the relative permeability in β phase (unit: m²); $\rho_\beta$ is the mass density of β phase (unit: kg/m³); $\mu_\beta$ is the dynamic viscosity in β phase (unit: Pa·s); and $P_\beta$ is the fluid pressure of β phase (unit: Pa).

Moreover, in TOUGH2MP, the mass conservation equation is solved by Newton's iteration method. For component k at time t+1, the remaining term $R_n^{k,t+1}$ is generated according to the change of the cumulative term of time step Δt. The flux and the injection source at time t+1 is calculated as:

$$R_n^{k,t+1} = M_n^{k,t+1} - M_n^{k,t} - \frac{\Delta t}{V_n} \left\{ \sum_m A_{nm} F_{nm}^{k,t+1} + V_n q_n^{k,t+1} \right\} = 0 \tag{e}$$

In the formula, n is the grid; m is the surface of the grid; $A_{nm}$ is the contact area between two grids (unit: m²); $M_n^{k,t}$ is the molar mass of component k on unit volume of grid n at time t (unit: mol/m³); Δt is the time step (unit: s); $V_n$ is the volume of grid n (unit: m³); $F_{nm}^{k,t+1}$ is the flow mass flux of component k between the two grid contact surfaces at time t+1 (unit: mol/(m²·s)); and $q_n^{k,t+1}$ is the source of component k injected into the grid n at time t+1 (unit: mol/(m³·s)).

In the time step Δt calculation of the above formula (e), the porosity and permeability among the hydraulic parameters are assumed to be constant values at the beginning of the time step calculation; $M_n^{k,t}$ represents the molar mass at the end of the previous time step calculation, also comprising the previous porosity $\phi$; $M_n^{k,t+1}$ and $F_{nm}^{k,t+1}$ represent the molar mass and mass flux at time t+1, also comprising the new porosity $\phi^{t+1}$; and the phase saturation S should be corrected according to the change of porosity, specifically calculated by the following formula:

$$S_l^t = S_l^{t+1} \frac{\phi^t}{\phi^{t+1}} \tag{f}$$

$$S_g^{t+1} = 1 - S_l^{t+1} \tag{g}$$

In the formula, $S_l^t$ is the liquid phase saturation at time t; $S_l^{t+1}$ is the liquid phase saturation at time t+1; and $S_g^{t+1}$ is the gas phase saturation at time t+1.

It should be noted that the simulation calculation of the thermal parameters by the TOUGH2MP software follows the laws of thermodynamics.

Optionally, the relative permeability of different phase states may be calculated by using Cauchy's formula:

$$k_{rl} = \hat{S}^4$$

$$k_{rg} = (1 - \hat{S})^2 (1 - \hat{S}^2)$$

$$\hat{S} = (S_l - S_{lr})/(1 - S_{lr} - S_{gr})$$

$$S_{lr} + S_{gr} < 1$$

The relative permeability of different phases may also be calculated by using the van Genuchten model:

$$k_{rl} = \begin{cases} \sqrt{S^*} \left\{ 1 - \left(1 - [S^*]^{1/\lambda}\right)^\lambda \right\}^2, & S_l, S_{ls} \\ 1, & S_l \geq S_{ls} \end{cases}$$

$$k_{rg} = \begin{cases} 1 - k_{rl}, & S_{gr} = 0 \\ (1 - \hat{S})^2 (1 - \hat{S}^2), & S_{gr} > 0 \end{cases}$$

$$S^* = (S_l - S_{lr})/(S_{lg} - S_{lr})$$

$$\hat{S} = (S_l - S_{lr})/(1 - S_{lr} - S_{gr})$$

$$0 \leq k_{rl}, k_{rg} \leq 1$$

When it comes to hydraulic calculations, the capillary pressure of the rock may be calculated by using the van Genuchten model:

$$P_{cap} = -P_0\big([S^*]^{-1/\lambda} - 1\big)^{1-\lambda}$$

$$-P_{max} \le P_{cap} \le 0$$

$$S^* = (S_l - S_{lr})/(S_{lz} - S_{lr}) \qquad 5$$

The TOUGH2MP software is a numerical simulator, mostly used for multi-dimensional fluid and heat flow of multi-component and multi-phase fluid mixtures in porous and fractured media. TOUGH2 adopts a multiphase extension of Darcy's law to describe fluid advection, and there is large-scale conduction of diffusivity at all stages. The heat flow occurs through conduction and convection, comprising the sensible heat effect and latent heat effect, in which the description of thermodynamic conditions is based on the assumption of local balance of all phases. TOUGH2 uses the integral finite difference method on an unstructured grid to solve mass and energy balances over the simulation domain.

In step S5, the appropriate constitutive model may be adopted in the FLAC3D software to perform creep calculation of the rock salt. Optionally, a creep stress model of rock salt may adopt the classic Newton Power law model, and the calculation formula is:

$$\dot{\epsilon}_{cr} = A\overline{\sigma}^n$$

In the formula, $\dot{\epsilon}_{cr}$ is the creep rate, A and n are rock salt material parameters (obtained through creep experiments), $\overline{\sigma}$ is the von Mises stress, which may be calculated as:

$$\overline{\sigma} = \sqrt{\frac{(\sigma_1 - \sigma_2)^2 + (\sigma_2 - \sigma_3)^2 + (\sigma_3 - \sigma_1)^2}{2}}$$

In the formula, $\sigma_1$, $\sigma_2$, and $\sigma_3$ are the three principal stresses of rock salt.

Further, in the TOUGH2MP software, the relative penetration model adopts the Cauchy model; the capillary pressure model of each rock layer adopts the van Genuchten model; and the FLAC3D creep stress calculation model adopts the Newton Power law model. Based on the geological data collected in the area, the rock salt creep parameter A is set to $2.30 \times 10^{-8}$ (1/year), and n is 2.0.

S52. The hydraulic and thermal parameter values (comprising rock temperature, pore pressure, and rock water saturation parameters) obtained after each Newton iteration calculation in the TOUGH2MP software in step S51 is imported into the FLAC3D software for stress calculation. After the stress calculation result is obtained, it is necessary to analyze and determine whether the rock salt is damaged (the determining criteria needs to be determined through external experiments). If damaged, then the new hydraulic and thermal parameter values caused by the change of the stress in the FLAC3D software (specifically the new porosity parameter value and the new permeability parameter value) are imported back into the TOUGH2MP software to update the corresponding hydraulic and thermal parameter values, and the next round of Newton iteration calculation is performed; if not damaged, then no values are imported back into the TOUGH2MP software, which also means that, the hydraulic and thermal parameter values calculated in the TOUGH2MP software are directly used for the next round of Newton iterative calculation.

S53. When the maximum coupling simulation time reaches the simulation time set in step S51, the coupling simulation ends, and the coupled simulation result is obtained. The coupled simulation result comprises, for example, the rock salt porosity, interlayer permeability, and rock salt creep.

S6. The coupled simulation result is analyzed, and then site selection suggestions for the salt cavern hydrogen storage to be established are provided. The site selection suggestions involve sealing properties (according to the rock salt permeability and the rock salt porosity) of the rock salt and the caprock layer, the thickness of the salt layer (according to the permeability and porosity), the interlayer variability (according to the rock salt permeability, interlayer permeability), and the rock salt creep stability (according to the rock salt creep).

The analysis process of the coupled simulation results is as follows.

(A) Effect of Rock Salt Permeability

In TOUGH2MP, the permeability of the rock salt is set to $10^{-19}$ m$^2$, $10^{-20}$ m$^2$, $10^{-21}$ m$^2$, and $10^{-22}$ m$^2$ respectively, while keeping other parameters unchanged. When analyzing the impact of rock salt permeability, in order to avoid the impact of interlayer parameter variability, the interlayer parameters may be set the same as the rock salt, the simulated internal pressure is 20 MPa, and the simulation time is 30 years.

Figure 2:
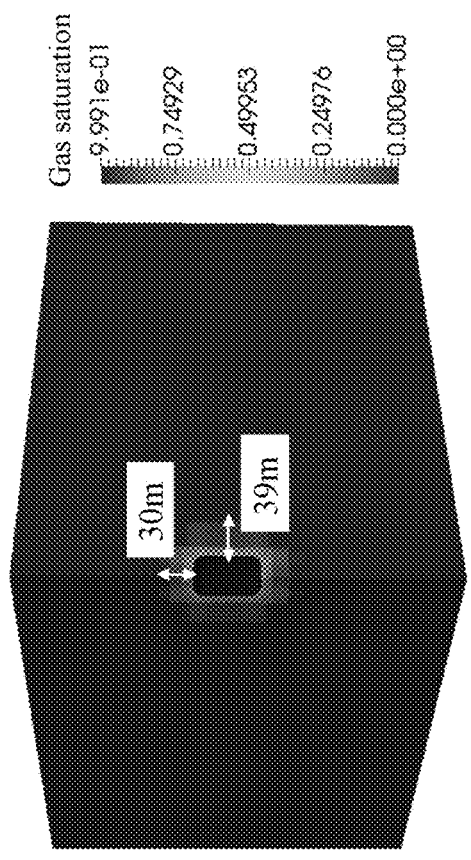
FIG. 2 is a schematic diagram of a gas saturation of the geological model at different rock salt permeabilities according to Embodiment 1 of the disclosure.
Figure 2:
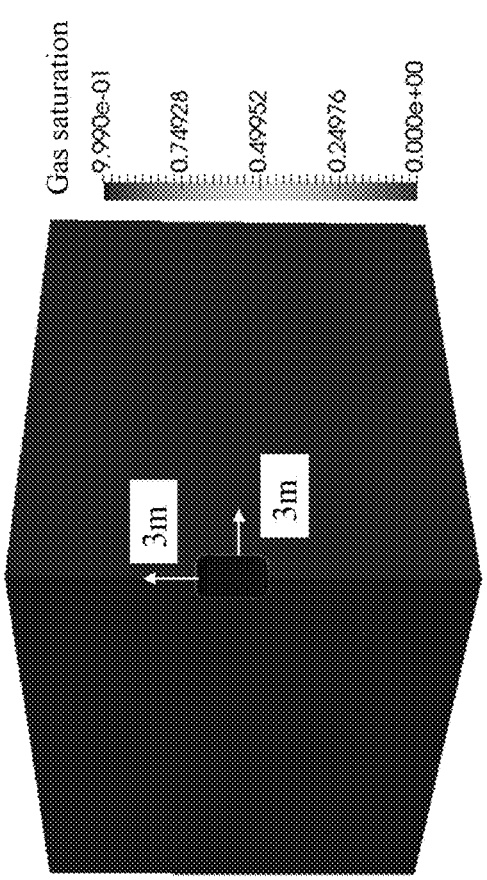
Figure 2:
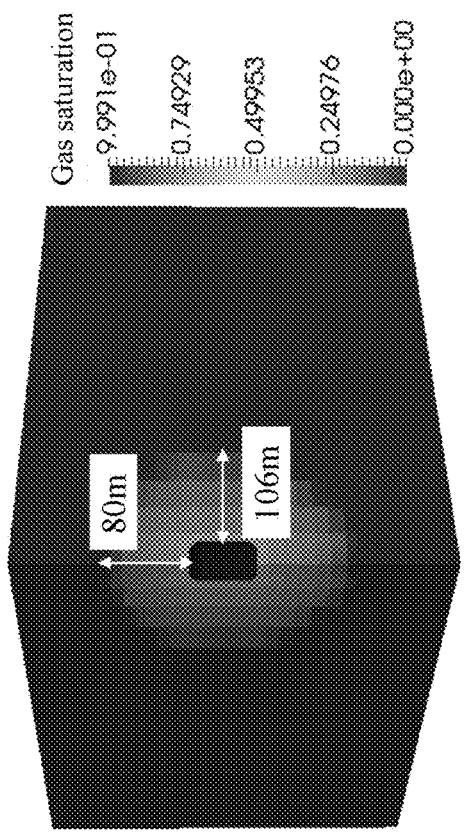
Figure 2:
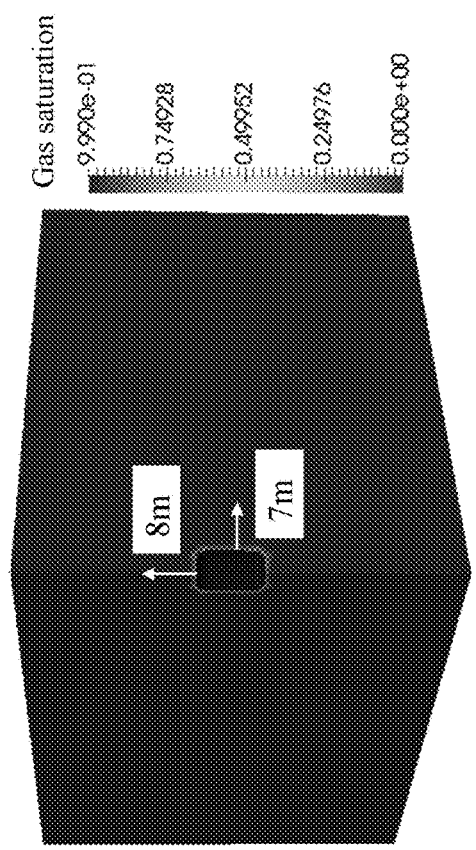

FIG. 2 shows the gas saturation of the model at different rock salt permeabilities. The gas saturation represents the hydrogen penetration of the surrounding rocks. When the rock salt permeability is $10^{-19}$ m$^2$, the model is penetrated approximately 106 meters in the X direction and approximately 80 meters in the Z direction; when the rock salt permeability is $10^{-20}$ m$^2$, the model is penetrated approximately 39 meters in the X direction and approximately 30 meters in the Z direction; when the rock salt permeability is $10^{-21}$ m$^2$ and $10^{-22}$ m$^2$, the model is penetrated less than 10 meters in the X and Z directions. It may be seen that the permeability of rock salt has a great impact on the sealing property of the salt cavern storing hydrogen. During site selection, it should be considered to select areas with rock salt permeability less than $10^{-20}$ m$^2$ to build the hydrogen storage. The conclusion is also in line with the current site selection criteria for domestic underground salt cavern natural gas storage, which verifies the accuracy of the model and the simulation result.

(B) Effect of Rock Salt Porosity

In TOUGH2MP, the porosity of the rock salt is set to 0.2% and 0.5% respectively, while keeping other parameters unchanged. When analyzing the impact of rock salt permeability, in order to avoid the impact of interlayer parameter variability, the interlayer parameters may be set the same as the rock salt, the simulated internal pressure is 20 MPa, and the simulation time is 30 years.

Figure 3:
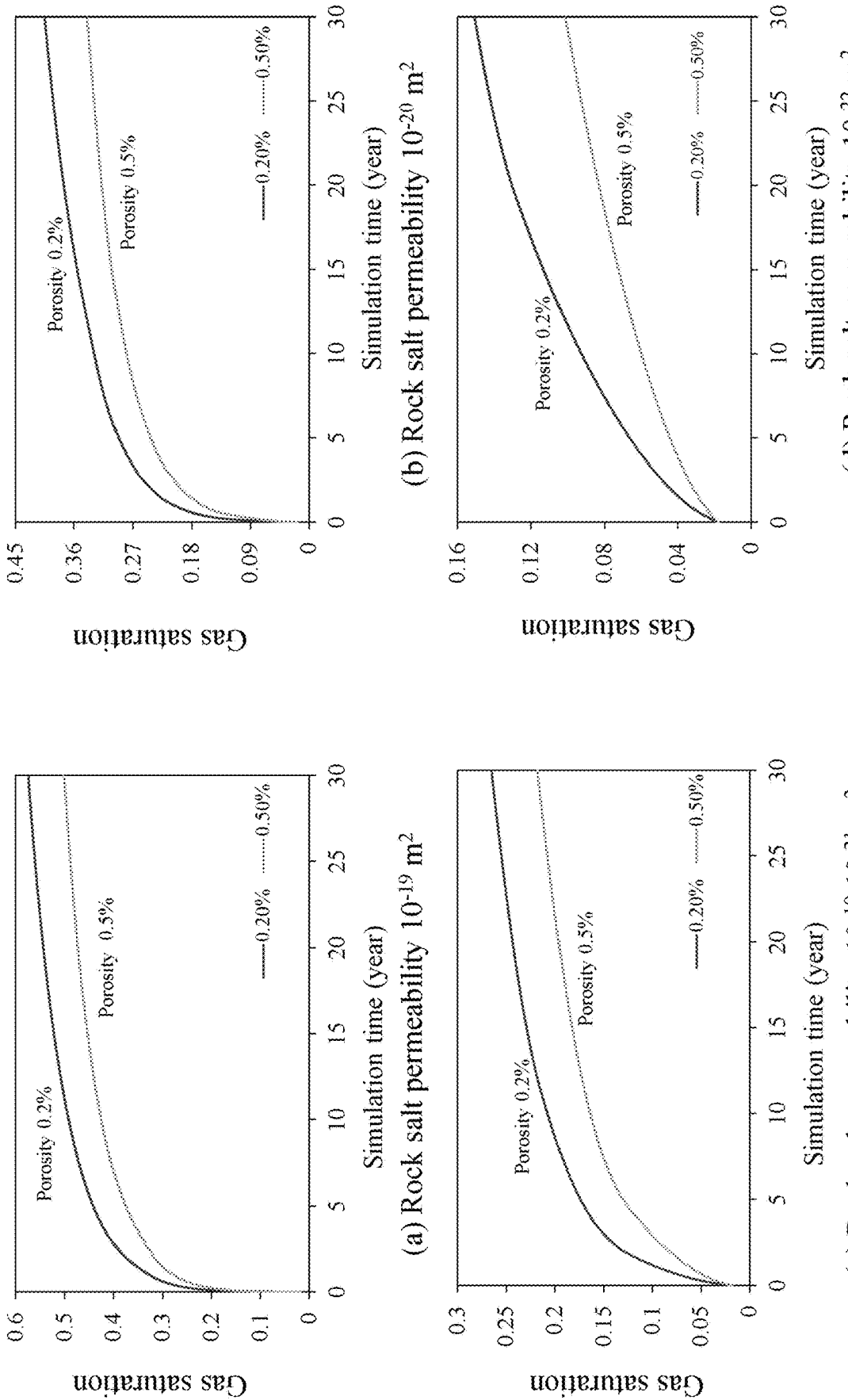
FIG. 3 is a schematic diagram of the gas saturation of the rock salt at the same position at different permeabilities and porosities according to Embodiment 1 of the disclosure.

FIG. 3 shows the gas saturation of the rock salt at the same position point (the point is a point closest to the salt cavern in the horizontal direction) at different permeabilities and porosities. It may be seen that as the porosity increases, the gas saturation decreases. This is because in the TOUGH2MP simulation, the porosity is the porosity saturated with water, and the existence of capillary pressure may prevent hydrogen from penetrating into the water-containing pores. In this way, it may be concluded that, compared with empty pores, pores saturated with gas or liquid can better prevent hydrogen from penetrating into the surrounding rock salt. At the same time, comparing FIG. 3 and FIG. 4, compared with porosity, it may be found that the permeability of rock salt has a greater impact on the sealing of hydrogen.

(C) Effect of Interlayer Permeability

According to the data collected in the target area, the interlayer in the area is usually mudstone containing rock salt, and the permeability should be similar to the rock salt. Therefore, during the simulation analysis, it is assumed that the difference in permeability between the interlayer and the rock salt is not greater than $10^2$, that is, when the permeability of the rock salt is $10^{-19}$ m$^2$, the maximum permeability of the interlayer is $10^{-17}$ m$^2$. At the same time, other simulation parameters are kept unchanged, the simulated internal pressure is 20 MPa, and the simulation time is 30 years.

Figure 4:
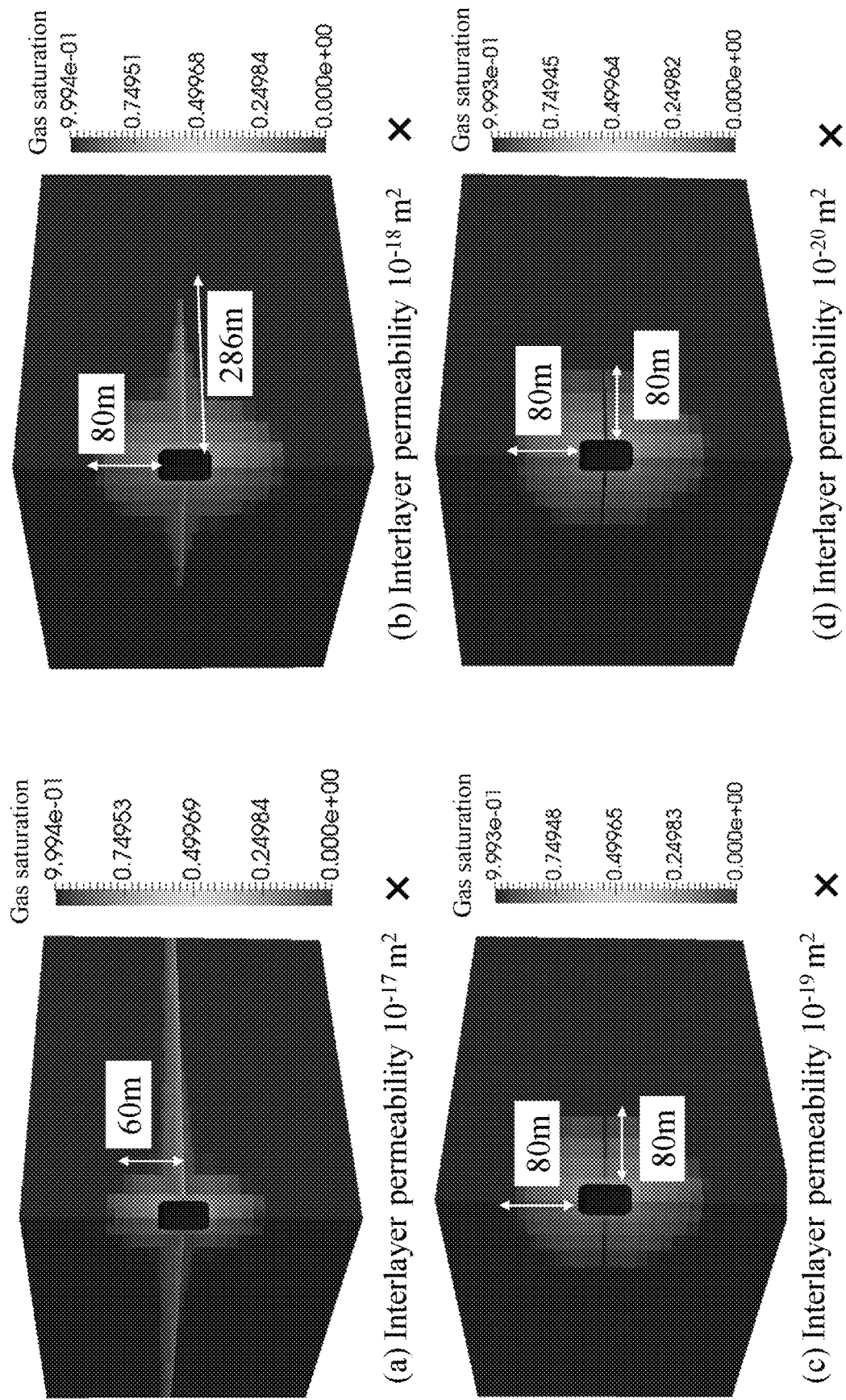
FIG. 4 is a schematic diagram of the gas saturation of the geological model at different interlayer permeabilities when the rock salt permeability is $10^{-19}$ m$^2$ according to Embodiment 1 of the disclosure.
Figure 5:
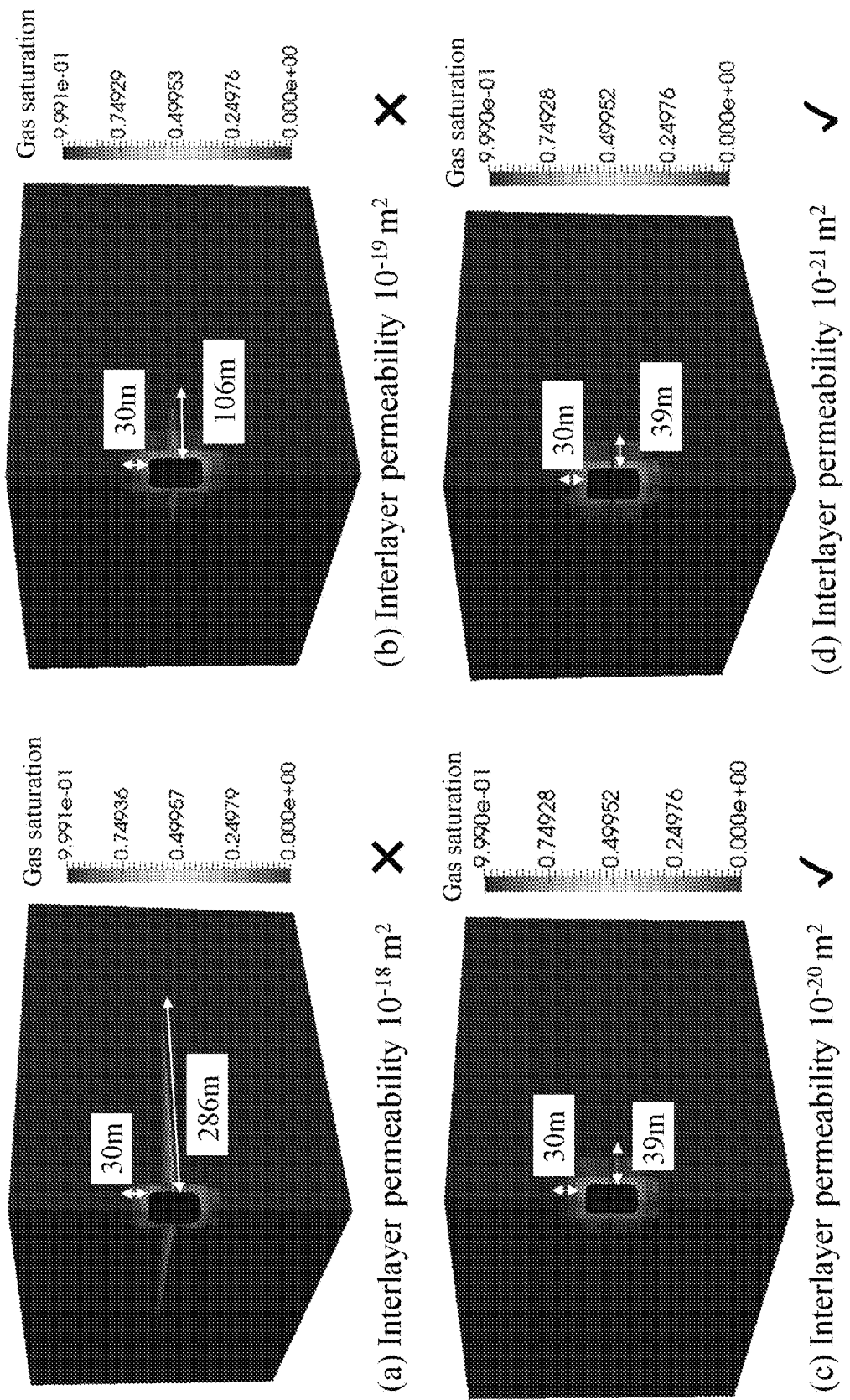
FIG. 5 is a schematic diagram of the gas saturation of the geological model at different interlayer permeabilities when the rock salt permeability is $10^{-20}$ m$^2$ according to Embodiment 1 of the disclosure.
Figure 6:
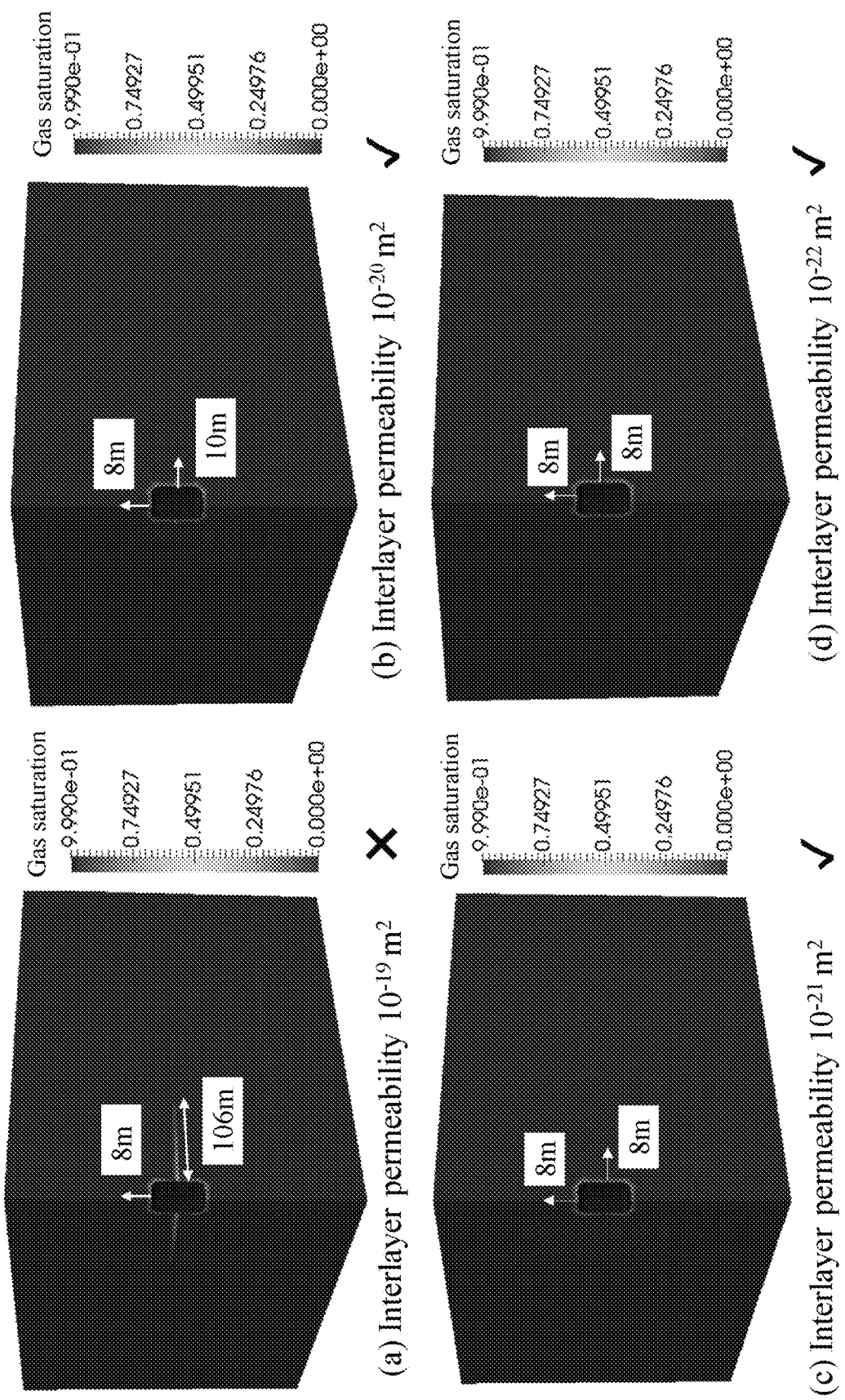
FIG. 6 is a schematic diagram of the gas saturation of the geological model at different interlayer permeabilities when the rock salt permeability is $10^{-21}$ m$^2$ according to Embodiment 1 of the disclosure.
Figure 7:
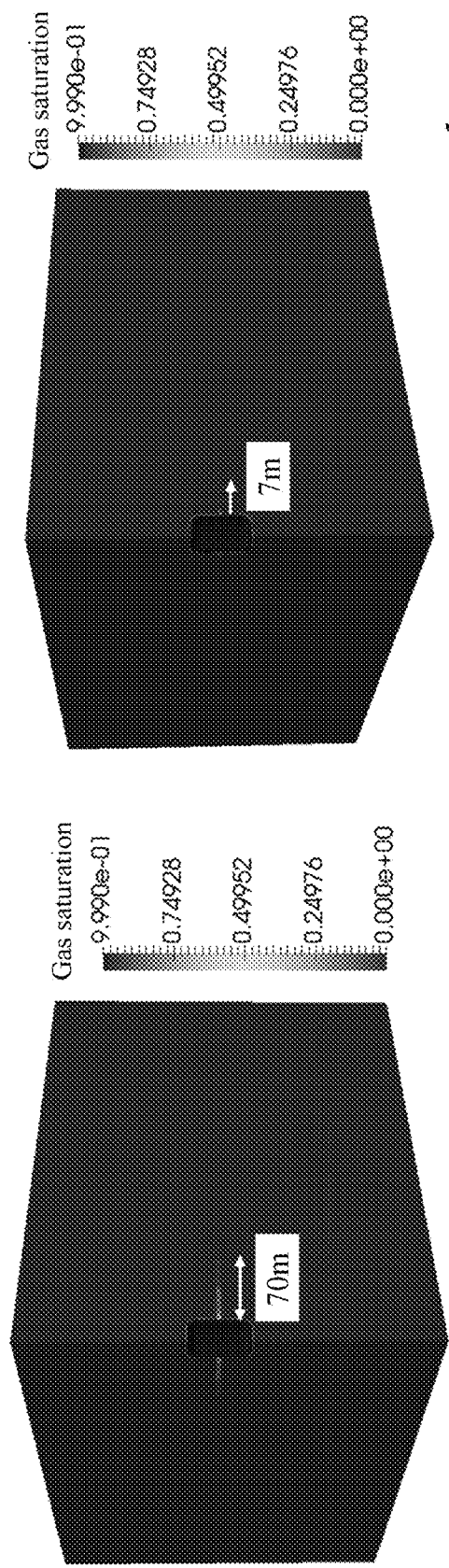
FIG. 7 is a schematic diagram of the gas saturation of the geological model at different interlayer permeabilities when the rock salt permeability is $10^{-22}$ m$^2$ according to Embodiment 1 of the disclosure.
Figure 7:
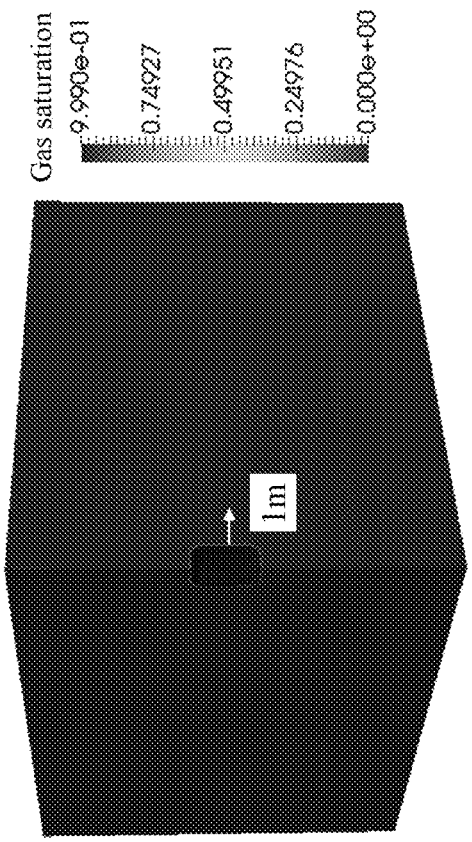

FIG. 4 to FIG. 7 show the gas saturation of the model at different rock salt permeabilities and interlayer permeabilities, in which FIG. 4 shows the gas saturation of the model at different interlayer permeabilities when the rock salt permeability is $10^{-19}$ m$^2$, FIG. 5 shows the gas saturation of the model when the rock salt permeability is $10^{-20}$ m$^2$, FIG. 6 shows the gas saturation of the model when the rock salt permeability is $10^{-21}$ m$^2$, and FIG. 7 shows the gas saturation of the model when the rock salt permeability is $10^{-22}$ m$^2$. It may be found that when the permeabilities of the interlayer and the rock salt are different, the interlayer becomes the main channel for hydrogen seepage, and the greater the permeability difference, the more significant the hydrogen penetration is in the direction of the interlayer. Comparing FIG. 6(b) and FIG. 7(a), although the permeabilities of the interlayer are both $10^{-20}$ m$^2$, the permeabilities of the rock salt are different, that is, the permeability difference between the interlayer and the rock salt is different. In FIG. 6(b), the interlayer permeability is 10 times of the rock salt, while in FIG. 7(a), the interlayer permeability is 100 times of the rock salt. Therefore, the permeability area in FIG. 7(a) is larger, indicating that when there is an interlayer, the permeability difference between the interlayer and the rock salt determines the permeability of hydrogen in the direction of the interlayer. Based on the above, when the permeability of rock salt is $10^{-19}$ m$^2$, it is not suitable to build hydrogen storage in an area having an interlayer; when the rock salt permeability is $10^{-20}$ m$^2$, the interlayer permeability should be less than $10^{-19}$ m$^2$; when the rock salt permeability is $10^{-21}$ m$^2$, the interlayer permeability should be less than $10^{-19}$ m$^2$; and when the rock salt permeability is $10^{-22}$ m$^2$, the interlayer permeability should be less than $10^{-20}$ m$^2$.

(D) Effect of Rock Salt Creep

Figure 8:
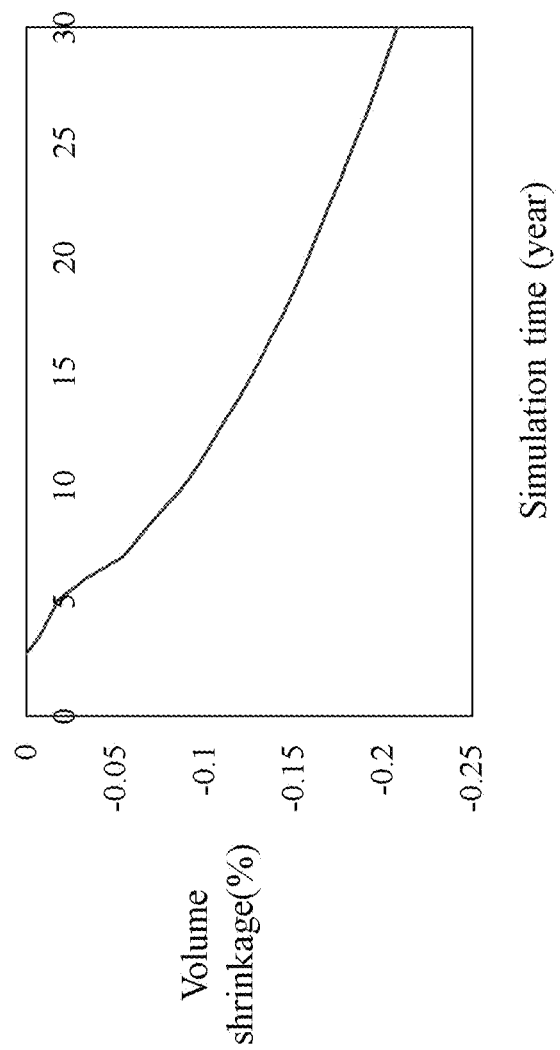
FIG. 8 is a schematic diagram of volume shrinkage of the salt cavern after 30 years of simulated operation of the salt cavern hydrogen storage in the geological model according to Embodiment 1 of the disclosure.

Based on the model that meets the sealing requirement, using simulation time as a single variable, FLAC3D is used to perform numerical simulation of the rock salt creep stability in an area to be screened. FIG. 8 shows the situation of volume shrinkage of the salt cavern hydrogen storage after 30 years of operation. It may be seen from the drawing that after 30 years of operation, the volume shrinkage of the salt cavern hydrogen storage merely is 0.2% approximately, which meets the availability criterion, indicating that the creep performance of the rock salt in the area meets the requirements for establishing a storage. The availability criterion is currently the main criterion in China for evaluating the creep performance of underground salt cavern natural gas storage, which is also applicable to evaluating the creep performance of underground salt cavern hydrogen storage.

What is claimed is:

1. A coupling numerical simulation method for site selection of an underground salt cavern hydrogen storage, comprising operations as follows:
   S1: obtaining geological data of an area where the salt cavern hydrogen storage is to be established, wherein the area where the salt cavern hydrogen storage is to be established in S1 is an unexploited salt mine;
   S2: establishing a three-dimensional model and performing grid meshing: establishing a geological model of the area where the single salt cavern hydrogen storage is to be established by using a geo-technical numerical modeling software according to the geological data, and dividing the geological model into computational grids; and performing computational grid densification processing on a peripheral area of a target area of the salt cavern hydrogen storage in the geological model, and selecting a set of computational grids on an inner edge of the target area of the salt cavern hydrogen storage as separate grids;
   S3: establishing and balancing an initial coupling field based on the geological model, and then performing excavation simulation of the target area of the salt cavern hydrogen storage in the geological model to obtain a geological model after excavation, wherein an excavation area for excavation simulation of the target area of the salt cavern hydrogen storage in the geological model is an internal area of the separate grid in the target area of the salt cavern hydrogen storage;
   S4: importing the geological model after excavation into a multi-phase flow simulation software, and resetting parameter values of the separate grids in the geological model after excavation in the multi-phase flow simulation software, specifically comprising:
   increasing a volume of the separate grid to an actual volume of the target area of the salt cavern hydrogen storage to obtain a hydrogen grid; and
   setting a porosity of the hydrogen grid to 0.999, setting a permeability to be significantly greater than a permeability of a surrounding rock salt, setting a hydrogen gas saturation to 1.0, and setting other parameters same as computational grids around the hydrogen grid;
   S5: coupling a stress model in the geo-technical numerical modeling software with hydraulic and thermal models in the multi-phase flow simulation software, and simulating a stress, hydraulic, and thermal coupling behavior process of a rock layer around the target area of the salt cavern hydrogen storage in the geological model after excavation to obtain a coupled simulation result.

2. The coupling numerical simulation method according to claim 1, wherein in S3, the initial coupling field comprises an initial in-situ stress field, a temperature field, and a seepage field, and establishing and balancing the initial coupling field based on the geological model specifically comprises:
   S31: setting a constraint boundary of the geological model, applying an overlying rock layer pressure, and establishing the initial in-situ stress field, the temperature field, and the seepage field of the geological model; and
   S32: performing a balance calculation of the initial in-situ stress field, the temperature field, and the seepage field, and inputting balanced parameter values comprising gravity, temperature, and pore pressure into each of the computational grids in the geological model.

3. The coupling numerical simulation method according to claim 2, wherein S5 comprises:

S51: initializing settings and synchronously updating initial values of hydraulic and thermal parameters and a simulation time in the geo-technical numerical modeling software and the multi-phase flow simulation software, and simulating and calculating the hydraulic and thermal parameters in the multi-phase flow simulation software, while simulating and calculating a stress in the geo-technical numerical modeling software;

S52: importing hydraulic and thermal parameter values obtained after each Newton iteration calculation in the multi-phase flow simulation software in S51 into the geo-technical numerical modeling software for stress calculation, analyzing and determining whether the rock salt is damaged after obtaining a stress calculation result; in response to being damaged, importing new hydraulic and thermal parameter values caused by change of the stress in the geo-technical numerical modeling software back into the multi-phase flow simulation software to update corresponding hydraulic and thermal parameter values, and performing a next round of Newton iterative calculation; and in response to not being damaged, importing no values back into the multi-phase flow simulation software, that is, directly using the hydraulic and thermal parameter values calculated in the multi-phase flow simulation software for the next round of Newton iteration calculation; and S53: ending the coupling simulation in response to a maximum coupling simulation time reaching the simulation time set in S51, and obtaining the coupled simulation result.

4. The coupling numerical simulation method according to claim 3, wherein in S1, the geological data comprises a depth of a roof of a caprock layer, a depth of a roof of a salt layer, a total thickness of the salt layer, a type and a thickness of an interlayer of the salt layer, an average density of the rock salt, an average density of the caprock layer, a floor, and the interlayer, a ground temperature, and a temperature gradient.

5. The coupling numerical simulation method according to claim 4, wherein the hydraulic parameters in S51 comprise at least one of porosity, permeability, gravity, pore pressure, and rock pore saturation; and the thermal parameters comprise at least one of temperature, specific heat capacity, and thermal conductivity.

6. The coupling numerical simulation method according to claim 5, wherein in S53, the coupled simulation result comprises rock salt porosity, interlayer permeability, and rock salt creep.

7. The coupling numerical simulation method according to claim 6, wherein in S5, the geo-technical numerical modeling software adopts a creep stress model and adopts a Newton Power law model.

8. The coupling numerical simulation method according to claim 7, wherein in S5, a relative penetration model in the multi-phase flow simulation software adopts a Cauchy model, and a capillary pressure model of each rock layer adopts van Genuchten model.

* * * * *